May 16, 1961  R. J. GAUBERT  2,984,288
HEAT APPLYING APPARATUS
Filed Dec. 15, 1958  5 Sheets-Sheet 1
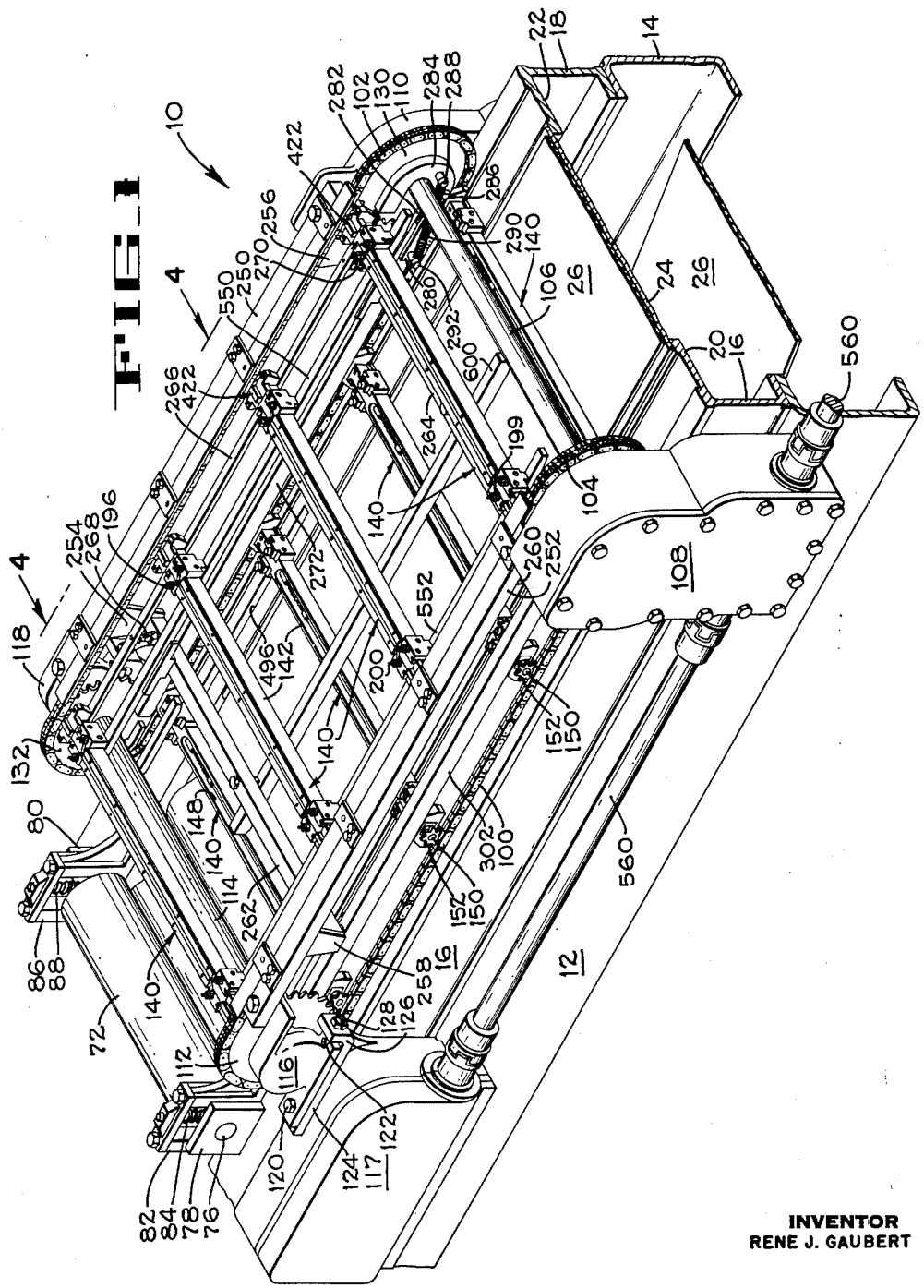
INVENTOR
RENE J. GAUBERT
BY *Hans G. Hoffmeister*
ATTORNEY

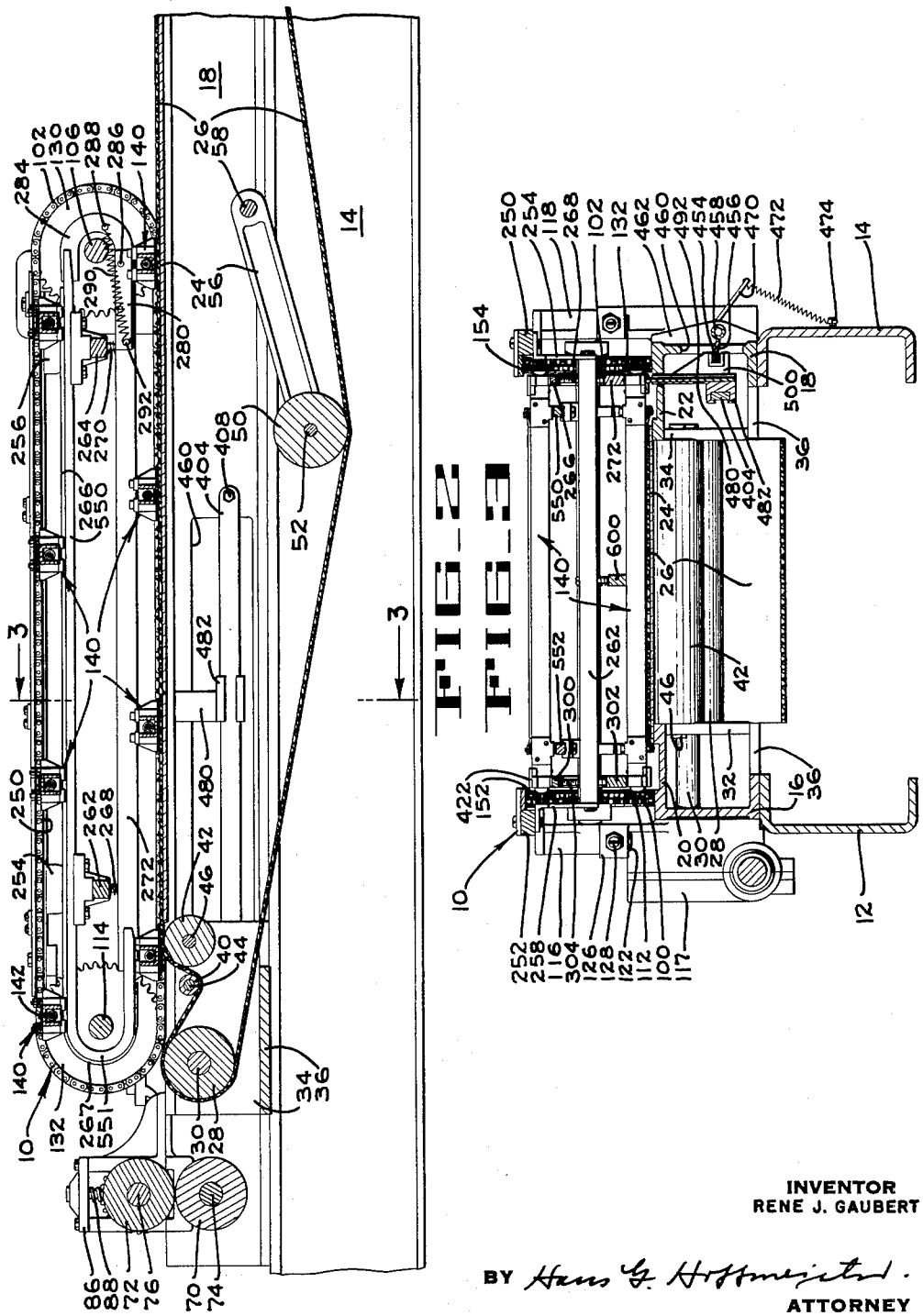

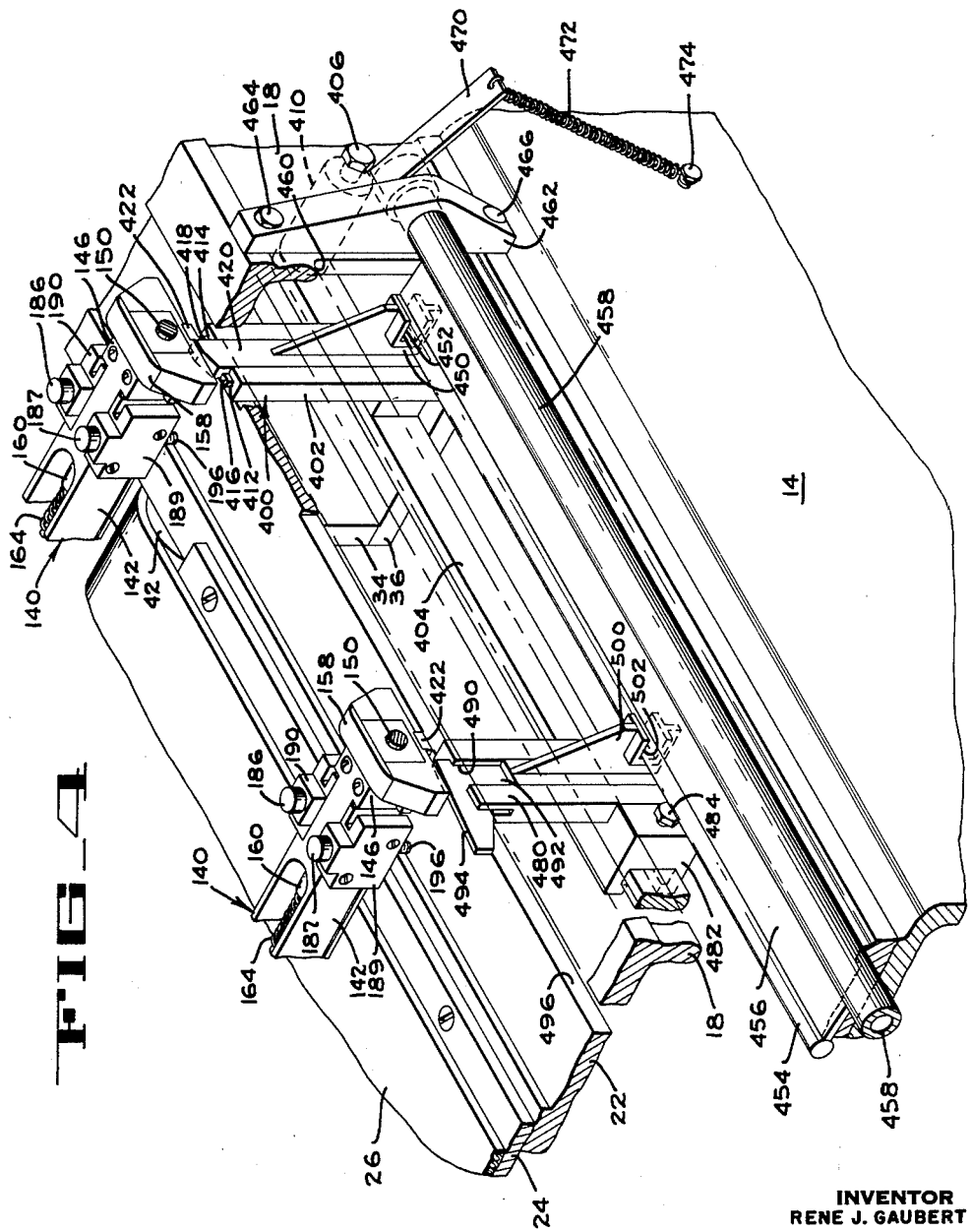

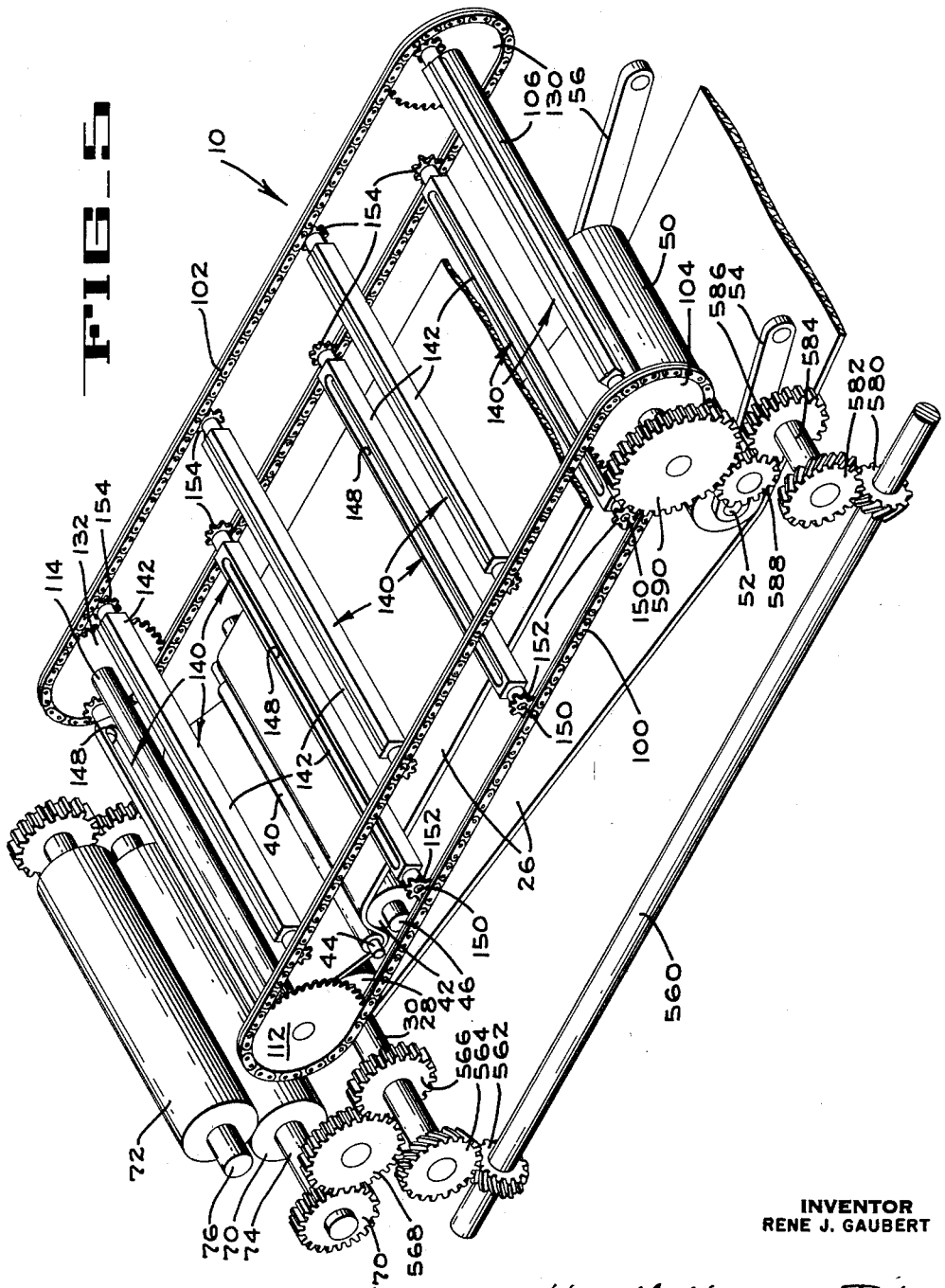

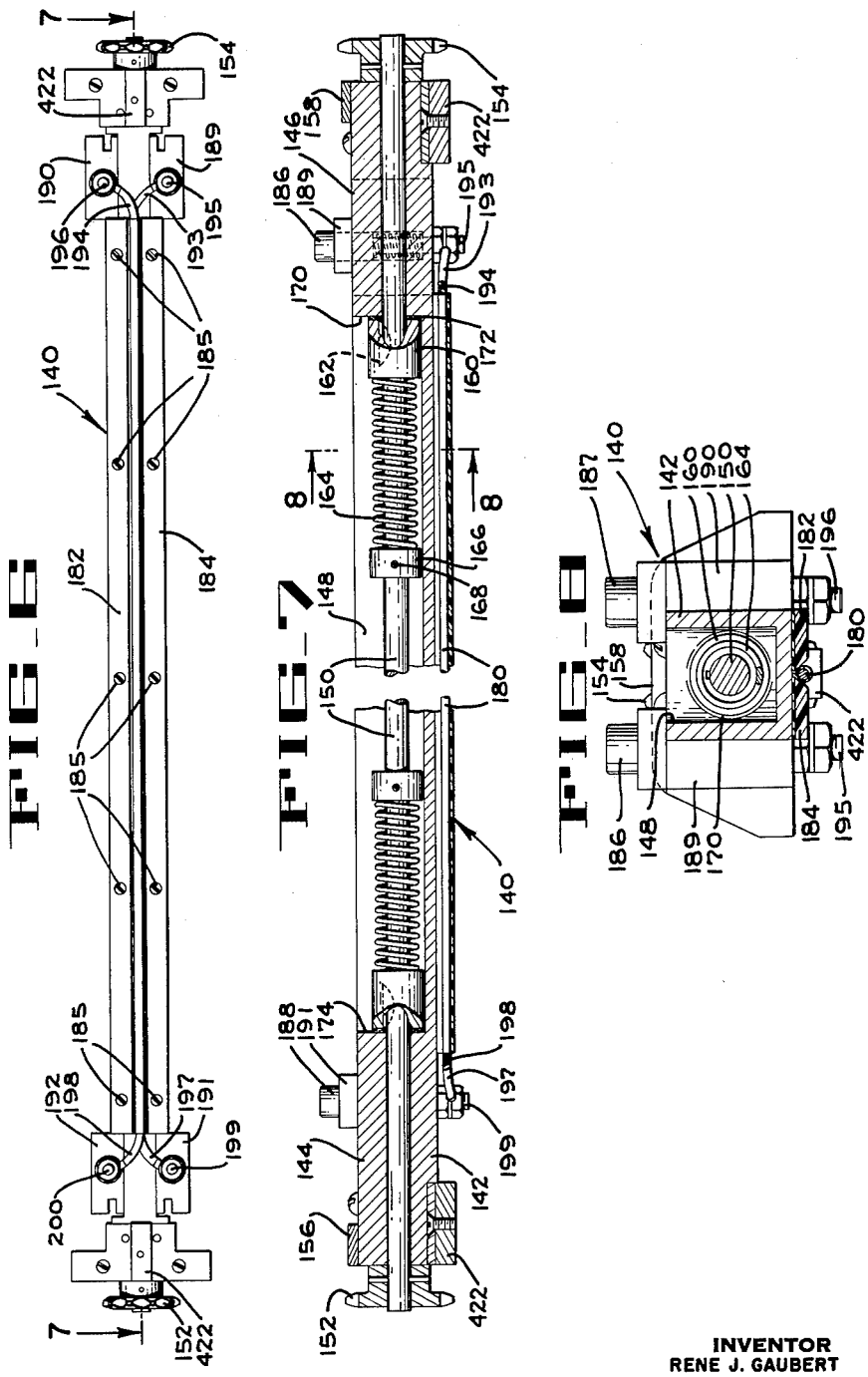

United States Patent Office 2,984,288
Patented May 16, 1961

2,984,288

HEAT APPLYING APPARATUS

Rene J. Gaubert, Oakland, Calif.

Filed Dec. 15, 1958, Ser. No. 780,545

14 Claims. (Cl. 154—42)

This invention pertains to machines for applying heat to heat sensitive sheet material, and more particularly to a mechanism for producing transverse seals across a continuous tube of heat sealable material at regularly spaced intervals therealong.

In the manufacture of bags made of heat sealable material it is customary to take the sheet material from a roll thereof and bring its side edges into overlapping relation and then heat seal them together to form a flattened tube of material. Transverse seals are then made at equally spaced areas along the tube, and transverse cuts are made adjacent the transverse seals to sever the tube into individual bags.

A similar procedure is employed in the packaging industry to seal articles within a wrapping of heat sealable material. This is accomplished by simultaneously feeding the articles in spaced apart relation and a sheet of the wrapping material along adjacent, parallel paths and folding the side edges of the sheet around the articles in a manner to bring the edges of the sheet into overlapping relation. The overlapping edges are sealed together so as to entube the articles, still in spaced apart relation, within a continuous tube of the material. The tube is then flattened and transversely sealed between each two adjacent articles within the tube, thus enclosing each of the articles within an individual package. The packages are then separated by cutting across each of the flattened and transversely sealed regions thereof, so that a sealed region remains on each side of each line of severance.

An object of the present invention is to provide improved means for applying heat in regions at spaced intervals along a strip of heat sensitive sheet material.

Another object of the invention is to provide a heat applying mechanism of the character indicated which is adjustable to vary the spacing between the regions of the elongate strip of material where it applies heat thereto.

Another object of the present invention is to provide a novel transverse sealing mechanism for use in a machine handling elongate strips of heat sealable sheet material.

Another object of the present invention is to provide a transverse sealing mechanism which is adjustable to produce bags or packages of any desired length within prescribed limits.

Another object of the present invention is to provide a transverse sealing mechanism of the character indicated which is capable of being adjusted to change the length of the bags or packages being produced, without interrupting operation of the machine.

These and other objects and advantages of the invention will be apparent from the following description and the accompanying drawings wherein:

Fig. 1 is an isometric of a portion of a bag making machine incorporating the transverse sealing mechanism of the present invention.

Fig. 2 is a central longitudinal section of the portion of the machine illustrated in Fig. 1.

Fig. 3 is a vertical section taken on line 3—3 of Fig. 2.

Fig. 4 is an enlarged fragmentary isometric taken on line 4—4 of Fig. 1 with certain parts broken away.

Fig. 5 is a schematic isometric illustrating the drive assembly for the various component mechanisms of the apparatus of Figs. 1–3.

Fig. 6 is a bottom view of one of the sealing bar assemblies.

Fig. 7 is a section taken on line 7—7 of Fig. 6.

Fig. 8 is a section taken on line 8—8 of Fig. 7.

The sealing mechanism 10 of the present invention is illustrated in the drawings as employed in a machine for making bags of thermoplastic sheet material such as polyethylene. It is to be understood, however, that the sealing mechanism of the invention is not limited to such use, but has been so illustrated merely as an example of the many applications wherein it can be employed advantageously. As a further example, the apparatus of the invention is adapted for use in, or in conjunction with, a packaging machine for enclosing and sealing articles within a wrapping of thermoplastic sheet material, in the manner hereinabove briefly explained. Another possible use for a mechanism incorporating the principles of the present invention is to cut elongate sheets or tubes of thermo-sensitive material into pieces of predetermined length.

Referring now to the drawings, the transverse sealing mechanism 10 of the present invention is supported on a pair of channel members 12 and 14 (Figs. 1 and 3) which are part of the machine frame. The channel members 12 and 14 are held in proper spaced relation with each other by suitable cross braces (not shown) and are supported on suitable legs (not shown). An additional pair of channel members 16 and 18 are mounted on the upper flanges of the channel members 12 and 14, respectively. The upper flanges 20 and 22 of the channel members 16 and 18, respectively, are wider than the ordinary channel member flanges and extend inwardly toward the center of the machine. A plate 24 (Figs. 1, 2 and 3) extends between and is fixed to the upper surfaces of the flanges 20 and 22 adjacent the inner edges thereof and serves as a backing member for the upper reach of an endless conveyor belt 26.

A drive drum 28 (Fig. 2) for the conveyor belt 26 is mounted on a shaft 30 which in turn is rotatably supported in suitable bearings on two vertical plates 32 and 34 (Fig. 3). Plate 32 is mounted between the under surface of the flange 20 on the channel member 16, and a horizontally extending support brace 36 fixed to and extending between the lower flanges of the channel members 16 and 18. Similarly, the plate 34 is mounted between the lower surface of the inner edge of the flange 22 of the channel member 18 and the brace 36. Two idler drums 40 and 42 (Fig. 2) are mounted on shafts 44 and 46, respectively. The shafts 44 and 46 are also mounted in suitable bearings fixed to the plates 32 and 34. The conveyor belt 26 is trained around the drive drum 28 which is adjacent the end portion of the plate 24. At the opposite end of the conveyor the belt 26 is trained around a suitable idler drum (not shown). Slack in the conveyor belt 26 is controlled by means of an idler drum 50 mounted on a shaft 52 rotatably supported on the ends of two support arms 54 and 56 (Figs. 2 and 5). The arm 56 is pivotally mounted on a stub shaft 58 fixed to the inner surface of the web of the channel member 18. The arm 54 is similarly pivotally mounted on a stub shaft (not shown) fixed to the inner surface of the web portion of the channel member 16.

Two opposed feed rolls 70 and 72 (Figs. 1, 2 and 5) are mounted adjacent the material receiving end of the transverse sealing mechanism 10, the left end of the device as viewed in Figs. 1 and 2. The lower roll 70 is mounted on a shaft 74 which is supported in suitable bearings (not shown) mounted on the channel members 16 and 18. The upper roll 72 is mounted on a shaft 76 which is supported in suitable bearing blocks 78 and 80 mounted for limited vertical movement. The block 78 is supported in a guide frame 82 and is urged downwardly toward the roll 70 by a spring 84 confined between the upper end of the bearing block 78 and the upper end of the guide frame 82. The bearing block 80 is mounted in a similar guide frame 86 fixed to the upper surface of the channel member 18 and a similar spring 88 is confined between the upper surface of the bearing block 80 and the upper end of the guide frame 86.

The bag material to be transversely sealed, having previously been formed into a flattened tube, passes between the feed rolls 70 and 72 over the drive roll 28 of the conveyor belt 26 and lies flat adjacent the upper surface of the upper run of the conveyor belt 26. Both the conveyor belt 26 and the bag material thereon pass beneath the idler roll 40 and then over the idler roll 42 and beneath the transverse sealing assembly 10 with the belt 26 in sliding engagement with the upper surface of the plate 24.

The sealing assembly 10 (Figs. 1 and 2) comprises two spaced apart, double width endless chains 100 and 102, one adjacent each side of the path of the conveyor belt 26. The chain 100 is trained around a drive sprocket 104 (Figs. 1 and 5) mounted on a shaft 106 one end of which is rotatably supported by a bearing fixed to a gear case 108 mounted on the channel member 16. The other end of the shaft 106 is similarly mounted for rotation in a suitable bearing fixed to a bearing housing 110 mounted on the channel member 19. At the opposite end of the assembly 10, the chain 100 is trained around an idler sprocket 112 mounted on a shaft 114 supported rotatably by suitable bearings in bearing housings 116 and 118 adjustably fixed to the channel members 16 and 18. Referring to Fig. 1, it will be seen that the bearing housing 116 is attached by cap screws 120 and 122 to a bracket 124 welded or otherwise fixed to a housing 117 attached to the channel member 16. The forward end 126 of the bracket 124 is turned upwardly and an adjustment screw 128 is threaded therethrough and abuts the forward face of the bearing housing 116 whereby the bearing housing may be moved longitudinally of the machine to adjust the tension in the chain 100. The bearing housing 118 is similarly mounted to permit adjustment of the tension in chain 102.

As set forth above, each of the chains 100 and 102 is a double width chain, in other words, each of the links is in effect two links side by side and connected to each other. The outer portion of the chain 100 is the portion which is trained around the sprockets 104 and 112 thus leaving the inner portion of the chain 100 free for a purpose which will be described hereinbelow. The chain 102 is similarly trained around a drive sprocket 130 fixed to the drive shaft 106 previously described, and around an idler sprocket 132 fixed to the shaft 114. Only the outer portion of the chain 102 engages the sprockets 130 and 132, leaving the inner portion of the chain 102 free for a purpose which will be described hereinbelow.

A plurality of identical sealing bar assemblies 140 (Fig. 1) extend between and are connected to the chains 100 and 102 in a manner to be described and are carried thereby. One of the sealing bar assemblies 140 is specifically illustrated in, and is best understood by reference to, Figs. 6, 7 and 8. The sealing bar assemblies 140 each includes a bar 142 having solid end portions 144 and 146 and a cut-out 148 at its mid portion to produce a channel cross section illustrated in Fig. 8. The solid end portions 144 and 146 of the bar 142 are each drilled longitudinally of the bar, and a rotatable shaft 150 extends through the entire length of the bar 142. Sprockets 152 and 154 are fixed to the opposite ends of the shaft 150 and these sprockets are adapted to engage the inner portions of the chains 100 and 102, respectively.

A guide shoe 156 is fixed to the bar 142 adjacent the sprocket 152, and a similar guide shoe 158 is fixed to the opposite end of the bar 142 adjacent the sprocket 154. Within the opening 148 a cylindrical member 160 is keyed to the shaft 150 by a Woodruff key 162 (Fig. 7) for rotation therewith. A spring 164 surrounds the shaft 150 and is confined between the cylindrical member 160 and a collar 166 slidably mounted on the shaft 150 and adapted to be fixed with respect thereto by a set screw 168. The spring 164 urges the cylindrical member 160 toward the flat vertical face 170 forming the end of the cut-out portion 148. A fiber washer 172 is inserted between the cylindrical member 160 and the vertical face 170. The spring pressed cylindrical member 160 together with the fiber washer 172 in effect is a brake assembly resisting rotation of the shaft 150 relative to the bar 142. A similar braking assembly is mounted on the shaft 150 adjacent the vertical face 174 at the opposite end of the cut-out portion 148 of the bar 142 to produce a balance system on the shaft 150.

The sealing mechanism comprises a resistance wire 180 (Fig. 7) extending longitudinally along the bottom face of the bar 142 between two plastic positioning elements 182 and 184 (Figs. 6 and 8) which likewise extend longitudinally of the bar 142, being secured to the bottom face thereof by countersunk machine screws 185 (Fig. 6). The wire 180 is slightly larger in diameter than the thickness of the plastic elements 182 and 184 so that it projects slightly below the lower face thereof (Fig. 8). The wire 180 is retained in the groove between the elements 182 and 184 by a thin sheet of Teflon, or similar material, which is wrapped around the wire but whose side edges are confined between the elements 182 and 184 and the bar 142.

In order to provide electrical connection to the resistance wire 180, two spring pressed contact buttons are located adjacent each of the opposite ends of the bar 142. The buttons 186 and 187 (Fig. 8) are located at one end of the bar as illustrated in Fig. 7, and only one contact button 188 of the two contact buttons at the other end of the bar 142 is shown. The contact buttons 186 and 187 are slidably mounted in suitable insulating blocks 189 and 190, respectively, fixed to the opposite sides of the bar 142 adjacent one end thereof. The contact button 188, and its companion contact button (not shown), are similarly mounted in insulating blocks 191 and 192 fixed to the opposite sides of the bar 142 adjacent the other end thereof. Each of the contact buttons projects upwardly above the upper surface of the bar 142 and has an integrally formed binding post which projects downwardly below the bottom surfaces of the insulating blocks 189, 190, 191 and 192, respectively. One end of the resistance wire 180 is connected by suitable leads 193 and 194 to the binding posts 195 and 196 associated with the contact buttons 186 and 187, respectively. The other end of the resistance wire 180 is similarly connected by suitable leads 197 and 198 to the binding posts 199 and 200 associated with the contact button not shown and the contact button 188, respectively.

Referring again to Figs. 1 and 2, a bar 250 extends longitudinally of the mechanism 10 between and is supported by the bearing housings 110 and 118. A similar longitudinally extending bar 252 is supported by the gear casing 108 and the bearing housing 116. Two brackets 254 and 256 are fixed to and extend downwardly from the bar 250 adjacent the end portions thereof. Similarly, two downwardly depending brackets 258 and 260 are fixed to and depend downwardly from the bar 252. A cross brace 262 extends between the brackets 254 and 258, and a similar cross brace 264 extends between and is supported by the brackets 256 and 260. A guide bar 266 extends parallel to and slightly inwardly from and below the upper reach of the chain 102. The guide bar 266 is fixed to the upper end of a stud 268 supported by the cross brace 262, and the upper end of a stud 270 fixed to the cross brace 264. A similar guide bar 272 extends slightly inwardly from and above the lower reach of the chain 102 and is fixed to the lower ends of the studs 268 and 270. The end of the guide rod 266 adjacent the material receiving end of the assembly 10 is curved around the axis of the shaft 114, in the manner illustrated at 267 (Fig. 2), and abuts the end of the lower guide bar 272. The end of the guide bar 272 adjacent the discharge end of the assembly 10 is provided with two plates 280 and 282 (Fig. 1) fixed to its opposite sides and extending beyond the end thereof. A U-shaped guide member 284 (Figs. 1 and 2) is pivotally mounted on a pin 286 extending through the plates 280 and 282 and one leg of the U-shaped guide member 284. A pin 288 is fixed to the U-shaped guide member and a spring 290 is connected between the pin 288 and a similar pin 292 fixed to the plate 280. The spring 290 has an over center snap action to maintain the U-shaped guide member 284 in its position illustrated in Figs. 1 and 2 wherein the opposite ends thereof abut the ends of the upper and lower guide bars 266 and 272, or in its opposite position, which is attained when the guide member 284 is rotated clockwise about its pivot pin 286 as viewed in Fig. 2, to remove the upper end of the guide member 284 away from the end of the upper guide bar 266.

It will be appreciated that an identical guide structure comprising an upper guide bar 300 and a lower guide bar 302 (Fig. 3) is mounted adjacent the chain 100 at the opposite side of the machine. The guide bars 300 and 302 are supported by a stud 304 fixed to the cross brace 262 and a similar stud (not shown) fixed to the cross brace 264. A U-shaped guide member (not shown) similar to the guide member 284 described above is mounted at the discharge end of the lower guide bar 302 in the same manner that the guide member 284 is mounted to the lower guide bar 272.

The sealing bar assemblies 140 are inserted by rotating the two U-shaped guide members, one of which is shown at 284, away from the discharge ends of the upper guide bars 266 and 300. The sealing bar assemblies 140 are slipped in so that the guide shoes 156 and 158 are above the upper guide bars 266 and 300 and the sprockets 152 and 154 engage the inner portions of the double width roller chains 100 and 102, respectively. It will be appreciated that since the brake assemblies of each bar 142 resist rotation of the associated sprockets 152 and 154 relative to the bar 142, there will be no relative movement between the chains 100 and 102 and the sprockets 152 and 154. Consequently, the sealing bar assemblies 140 will be advanced by the chains 100 and 102 along the endless path defined by the upper guide bars 266 and 300, the lower guide bars 272 and 302 and the U-shaped guide members, one of which is shown at 284. The number of the individual sealing bar assemblies 140 thus inserted may be increased or decreased as required for the particular length bags to be produced by the machine.

The spacing of the sealing bar assemblies 140 as they are advanced by the chains 100 and 102 is controlled by a trip mechanism, illustrated in Fig. 4, comprising a latch assembly 400 adjacent the material receiving end of the sealing mechanism 10. The latch assembly 400 is adapted to catch each of the sealing bar assemblies 140 and hold it stationary until the preceding sealing bar assembly 140 has progressed the length of one bag, and then to release the next bar 140 which is then propelled by the chains 100 and 102 for travel with the constantly advancing tubular strip of bag material to produce a transverse heat sealed joint thereacross. The latch assembly 400 comprises a vertical guide bracket 402 fixed to a longitudinally extending brace 404. The brace 404 is mounted on the web portion of the channel member 18 by a pair of studs 406 (Fig. 4) and 408 (Fig. 2). Suitable spacers such as that illustrated at 410 in Fig. 4 space the brace 404 inwardly from the inner surface of the web portion of the channel member 18. The guide bracket 402 is provided with two opposed vertical slots 412 and 414 which slidably receive two outwardly projecting flanges 416 and 418, respectively, on a latch member 420 to guide said latch member for vertical movement.

When the latch member is in its uppermost position, as illustrated in Fig. 4, it projects into the path of movement of a block 422 (Figs. 4, 6, 7 and 8) fixed to the under side of the bar 142 of the sealing bar assembly 140. When the block 422 engages the latch 420 the assembly 140 is stopped. Since the chains 100 and 102 are continuously moving, the sprockets 152 and 154 on the sealing bar assembly 140 will rotate thus rotating the shaft 150 relatively to the bar 142, and overcoming the resistance of the previously described brake assemblies contained therewithin. Since the two sprockets 152 and 154 are each fixed to the shaft 150 and must rotate together equal relative movement will occur between each of the sprockets and its associated chain, causing the sealing assembly 140 to remain in its proper orientation extending transversely between the chains. When the latch 420 is lowered so that it clears the block 422, the brake assemblies will stop the rotation of the shaft 150, thus ending relative movement between the sprockets 152 and 154 and their respective chains 100 and 102 and the complete assembly 140 will be moved forward by the action of the chains 100 and 102 into engagement with the bag material to produce a transverse heat sealed joint thereacross.

The mechanism for lowering the latch 420 comprises a bracket 450 (Fig. 4) fixed to the latch member 420 and projecting outwardly therefrom toward the side of the machine frame. A horizontal slot 452 is formed in the lower portion of the bracket 450. The horizontal slot 452 embraces a round bar 454 (Figs. 3 and 4) fixed to one edge of a plate 456 the other edge of which is fixed to a shaft 458. A suitable opening 460 is formed in the web portion of the channel member 18 (Figs. 2 and 4) to permit the plate 456 to project therethrough. One end of the shaft 458 (Figs. 3 and 4) is rotatably mounted in a bracket 462 fixed to the outer surface of the channel member 18 by cap screws 464 and 466. The opposite end of the shaft 458 is rotatably mounted in a similar bracket (not shown) fixed to the outer surface of the channel member 18. A crank arm 470 is fixed to the shaft 458 and a spring 472 interconnects the outer end of the crank arm 470 and a stud 474 fixed to the channel member 14 whereby the shaft 458 is urged to rotate in a direction to move the plate 456 so that it urges the latch member 420 to its upper position.

A second vertical guide bracket 480 is fixed to a C-shaped clamp structure 482 which embraces the brace 404 and is slidable therealong and is adapted to be fixed in any position along the length thereof by the tightening of a pair of cap screws, one of which is shown at 484, threaded through the C-shaped clamp 482 and adapted to abut the surface of the brace 404. A vertical guide 480 is provided with opposed vertical guide slots, one of which is shown at 490. A slide 492 is slidably mounted within the vertical slots and is provided at its upper end with an inclined cam surface 494. The cam surface 494 projects upwardly through a longitudinal slot 496 (Figs. 1 and 4) formed in the upper flange 22 of the channel member 18 into the path of movement of the blocks 422 on the sealing bar assemblies 140. An outwardly projecting bracket 500 (Figs. 3 and 4) is fixed to the outer surface of the slide member 492 and is provided adjacent its lower end with a horizontal slot 502 which embraces the bar 454 fixed to the plate 456.

From the foregoing structure, it may be seen that when the block 422 of one of the sealing bar assemblies 140 engages the cam surface 494 and forces the slide 492 downwardly the bar 454 will be depressed, rotating the shaft 458 to depress the latch member 420 and thereby release the following sealing bar assembly 140. It should be readily apparent that adjustment of the position of the vertical guide bracket 480 with respect to the guide bracket 402 and the latch member 420, alters the length of the tube of bag stock that passes the latch member 420 after each sealing bar 140 is released and before the next sealing bar is released. Thus the machine 10 is adapted to produce bags of different lengths.

Referring again now to Figs. 1 and 2, it will be seen that a bus bar 550 is supported by the cross braces 262 and 264 inwardly from the guide bar 266 in a position to be contacted by the spring pressed contact buttons 186 and 187 on the sealing bar assembly 140 while said assembly is traveling with the upper reaches of the chains 100 and 102. The bus bar 550 is curved about the axis of the shaft 114 adjacent the material receiving end of the assembly 10, in the manner indicated at 551 (Fig. 2), and terminates slightly beyond the rest position of the sealing bar assemblies 140 in the direction of travel of the chains 100 and 102 when the assemblies 140 are engaging the latch 420 in the manner described above. A similar bus bar 552 (Fig. 3) is mounted on the cross braces 262 and 264 adjacent the opposite side of the machine and is adapted to be contacted by the spring pressed contact buttons, one of which is shown at 188 in Fig. 7, connected to the opposite end of the sealing wire 180. The bus bars 550 and 552 are connected to the opposite poles of a suitable source of current (not shown) whereby an electric current is passed through the wire 180 of each of the heat seal assemblies 140 while they are traveling with the upper reach of the chains 100 and 102 in order to heat the wire to the proper temperature for effecting the desired transverse heat sealed joints.

The drive mechanism of the mechanism 10 comprises a line shaft 560 adjacent the near side of the machine as viewed in Figs. 1 and 5. The line shaft is provided with a worm 562 (Fig. 5) which engages a worm wheel 564 fixed to the shaft 30 on which the drive roller 28 for the conveyor belt 26 is mounted. A spur gear 566 is fixed to the shaft 30 and, through an idler gear 568, drives a gear 570 fixed to the shaft 74 on which the lower feed roll 70 is mounted. A second worm 580 fixed to the line shaft 560 drives a worm wheel 582 fixed to an idler shaft 584 mounted in the gear casing 108. A gear 586 fixed to the shaft 584 meshes with an idler gear 588 which in turn meshes with and drives a gear 590 fixed to the shaft 106 on which the drive sprockets 104 and 130 are fixed.

In the operation of the mechanism 10, heat sealable bag material in the form of a flattened tube enters between the drive rolls 70 and 72 and lies on top of the upper reach of the conveyor belt 26. The flattened tube of bag material is depressed beneath the guide roll 40 adjacent the latch assembly 400 so that it will not be contacted by the sealing bar assemblies 140 until they are released by the latch 420. A sufficient number of sealing bar assemblies 140 are placed in the guide system in engagement with the chains 100 and 102 so that one assembly 140 will always be in engagement with the latch 420 when the preceding unit 140 depresses the latch releasing cam 494. Each of the sealing bar assemblies 140, when released by the latch 420, travels with the chains 100 and 102 which are being driven at the same linear speed as the conveyor belt 26 upon which the flattened tube of bag material rests. The assemblies 140 are pressed downwardly by the guide bars 272 and 302, and by a guide bar 600 fixed to the under side of the central portion of the cross braces 262 and 264 and adapted to contact the central portion of each of the sealing bar assemblies 140, to press the heated wires 180 of said assemblies against the bag material. The backing plate 24 holds the upper reach of the conveyor belt 26 flat and thus assures that all of the sealing assemblies 140 will bear against the bag stock with equal pressure and that the pressure exerted by each assembly 140 will be evenly distributed throughout the full width of the bag stock.

Each of the sealing wires 180 remains in engagement with the bag stock for the full duration of the time required for the stock to advance from the idler drum 42 to a point vertically below the shaft 106. Thus, the time duration of each period of contact of a sealing wire 180 with the bag stock is of such length that an efficient seal of the stock is assured without requiring that the sealing wire 180 be heated to a temperature apt to burn or sever the bag stock.

As the continuously advancing tube of bag stock passes from the sealing mechanism 10, it may pass into and through a transverse severing assembly (not shown) where the tube is cut across adjacent each of the transverse seals, thus producing bags whose length corresponds to the linear distance between the transverse seals produced by the sealing mechanism 10.

After each heat seal assembly 140 has reached the sprockets 104 and 130 it is returned along the upper reaches of the chains 100 and 102 to the latch mechanism 400.

While the preferred embodiment of the present invention has been described herein, it is evident that various changes may be made in its construction without departing from the spirit of the invention as defined in the appended claims.

Having thus described my invention, what I claim and desire to protect by Letters Patent is:

1. In a device for producing a transverse heat sealed joint across a tube of heat sealable material, a conveyor for carrying said tube of material along a predetermined path of movement, endless conveying means mounted adjacent the path of movement of said tube and including a reach adjacent and substantially parallel to said path, means for driving said conveying means at the same linear speed as said conveyor, a heat sealing assembly carried by said conveying means, said heat sealing assembly being mounted for movement with said conveying means and for relative movement longitudinally thereof, a latch mechanism mounted adjacent the path of the tube of material and said reach of the endless conveying means for releasably stopping said heat sealing assembly to thereby cause relative movement between the assembly and said endless conveying means, and means for effecting release of said latch mechanism to permit the heat sealing assembly to move with said endless conveying means to contact said tube of material and effect a transverse heat sealed joint thereacross while traveling therewith.

2. In a device for producing transverse heat sealed joints across a tube of heat sealable material, a conveyor for carrying said tube of material along a predetermined path of movement, endless conveying means mounted adjacent said path with a reach of said endless conveying means substantially parallel to the path, means for driving said conveying means at the same linear speed as said conveyor, a plurality of heat sealing assemblies carried by said conveying means, said heat sealing assemblies being mounted for movement with said conveying means and for relative movement longitudinally thereof, means for resisting movement of said heat sealing assemblies relative to said conveying means, a latch mechanism mounted adjacent the path of the tube of material and said reach of the endless conveying means for releasably holding one of said heat sealing assemblies to thereby cause relative movement between said one assembly and said endless conveying means, and means for effecting the release of said latch mechanism to permit the heat sealing assembly restrained thereby to move with said endless conveying means to contact said tube of material and effect a transverse heat sealed joint thereacross while traveling therewith.

3. In a device for producing transverse heat sealed joints across a tube of heat sealable material, a conveyor for carrying said tube of material along a predetermined path of movement, a pair of parallel endless chains, means movably mounting the chains with one reach of each chain adjacent said predetermined path of movement, means for driving said chains at the same linear speed as said conveyor, a plurality of heat sealing assemblies extending transversely between said chains, rotatable sprockets on said assemblies engaging said chains, guide means adjacent said chains, said heat sealable assemblies being mounted for movement along said guide means in position to engage and heat seal the tube of material moving in said path, means for resisting rotation of said sprockets relative to said heat sealing assemblies to cause said heat sealing assemblies to move with said chains along said guide means, and means for temporarily arresting motion of one of said assemblies relative to said guide means while motion of said chains continues and the sprockets of said one assembly rotate.

4. In a device for producing a transverse heat sealed joint across a tube of heat sealable material, a conveyor for carrying said tube of material along a predetermined path of movement, a pair of endless chains movably mounted adjacent said predetermined path of movement, one reach of each of said endless chains being adjacent and substantially parallel to said predetermined path of movement, means for driving said chains at the same linear speed as said conveyor, a heat sealing assembly extending transversely between said chains, rotatable sprockets on said assembly engaging said chains, guide means extending parallel to said chains, said heat sealing assembly being mounted for movement along said guide means, a latch mechanism adjacent said predetermined path of the tube of material and said reaches of the endless chains for temporarily immobilizing said heat sealing assembly to thereby cause relative movement between the assembly and said endless chains, and means for effecting release of said latch mechanism to permit the heat sealing assembly to move with said endless chains to contact said tube of material and effect a transverse heat sealed joint thereacross while traveling therewith.

5. In a device for producing transverse heat sealed joints across a tube of heat sealable material, a conveyor for carrying said tube of material along a predetermined path of movement, a pair of endless chains movably mounted adjacent said path of movement of said tube of material, one reach of each of said endless chains being adjacent and substantially parallel to said predetermined path of movement, means for driving said chains at the same linear speed as said conveyor, a plurality of heat sealing assemblies extending transversely between said chains, rotatable sprockets on said heat sealing assemblies engaging said chains, guide means extending parallel to said chains, said heat sealing assemblies being mounted for movement longitudinally of said guide means in position to engage and heat seal the tube of material moving along said path, means for resisting rotation of said sprockets relative to said sealing assemblies to thereby cause said sealing assemblies to move with said chains along said guide means, a latch mechanism adjacent said predetermined path of movement of the tube of material and said reaches of the chains for releasably holding said heat sealing assemblies to thereby cause relative movement between the assemblies and said endless chains, and means for effecting release of said latch mechanism to permit a heat sealing assembly being restrained thereby to move with said endless chains to contact said tube of material and effect a transverse heat sealed joint thereacross while traveling therewith.

6. In a device for producing transverse heat sealed joints across a tube of heat sealable material, a first conveyor for carrying said tube of material along a predetermined path of movement, a second conveyor having a portion substantially parallel to said path of movement, a plurality of heat sealing assemblies carried by said second conveyor, said heat sealing assemblies also being capable of movement relative to said second conveyor longitudinally thereof, latch means adjacent the path of movement of said heat sealing assemblies adapted to engage each of said assemblies and interrupt movement thereof with said second conveyor, a latch releasing mechanism adjacent the path of movement of said heat sealing assemblies, said releasing mechanism being adapted to be actuated by each of said heat sealing assemblies to release said latch means to permit the following heat sealing assembly to commence movement with said second conveyor, and means for adjusting the position of said latch release mechanism relative to said latch means to adjust the spacing at which transverse heat sealed joints are produced in said tube of material.

7. In a device for producing transverse heat sealed joints across a tube of heat sealable material, a first conveyor for carrying said tube of material along a predetermined path of movement, a second conveyor having a portion adjacent and substantially equidistantly spaced from said path of movement throughout the length of said section, a plurality of heat sealing assemblies carried by said second conveyor, said heat sealing assemblies also being capable of movement relative to said second conveyor longitudinally thereof, latch means adjacent the path of movement of said heat sealing assemblies adapted to engage each of said assemblies and interrupt movement thereof with said second conveyor, a latch releasing mechanism adjacent the path of movement of said heat sealing assemblies, cam means on said releasing mechanism, said cam means being movable by each of said heat sealing assemblies to cause said releasing mechanism to release said latch means to permit the following heat sealing assembly to commence movement with said second conveyor, said latch release mechanism being adjustable relatively to said latch means to adjust the spacing at which transverse heat sealed joints are produced in said tube of material.

8. In a device for producing transverse heat sealed joints across a tube of heat sealable material, a first conveyor for carrying said tube of material along a predetermined path of movement, a second conveyor having a portion adjacent and subsequently parallel to said path of movement, a plurality of heat sealing assemblies carried by said second conveyor, said heat sealing assemblies also being capable of movement relative to said second conveyor longitudinally thereof, latch means adjacent the path of movement of said heat sealing assemblies adapted to engage each of said assemblies and interrupt movement thereof with said second conveyor, a latch releasing mechanism adjacent the path of movement of said heat sealing assemblies, said releasing mechanism being adapted to be actuated by each of said heat sealing assemblies to release said latch means to permit the following heat sealing assembly to commence movement with said second conveyor, and means for adjusting the position of said latch release mechanism relative to said latch means to adjust the spacing along said tube of material at which transverse heat sealed joints are produced, said adjusting means being capable of adjustment while the machine is operating.

9. In a device for producing transverse heat sealed joints across a tube of heat sealable material, a first conveyor for carrying said tube of material along a predetermined path of movement, a second conveyor having a portion substantially tangent to said path of movement, a plurality of heat sealing assemblies carried by said second conveyor, said heat sealing assemblies also being capable of movement relative to said second conveyor along the length thereof, latch means adjacent the path of movement of said heat sealing assemblies adapted to engage each of said assemblies and interrupt movement thereof with said second conveyor, a latch releasing mechanism adjacent the path of movement of said heat sealing assemblies, cam means on said releasing mechanism, said cam means being adapted to be actuated by each of said heat sealing assemblies to cause said releasing means to release said latch means to permit the following heat sealing assembly to commence movement with said second conveyor, and means for adjusting the position of said latch release mechanism relative to said latch means to vary the spacing at which transverse heat sealed joints are produced in said tube of material, said adjusting means being capable of adjustment while the machine is operating.

10. In a device for applying heat to heat sensitive material, means for advancing the material along a predetermined path, endless conveyor means mounted adjacent said material advancing means and including a section adjacent and spaced equidistantly from said path throughout the length of said section of the endless conveyor means, a plurality of heat applying assemblies carried by said endless conveyor means in position for each assembly to transmit heat to material being advanced by said advancing means while the assembly is carried along said section of the endless conveyor means, means yieldably connecting each heat applying assembly to said endless conveyor means for movement therewith, latch means for releasably engaging and thereby temporarily immobilizing the heat applying assemblies individually while the endless conveyor means continues to operate, and means operable when one heat applying assembly has been carried a predetermined distance from said latch means for releasing said latch means to permit the next successive heat applying assembly to resume movement with said endless conveyor means.

11. In a device for applying heat to heat sensitive material, means for advancing the material along a predetermined path, endless conveyor means mounted adjacent said material advancing means and including a section adjacent and spaced equidistantly from said path throughout the length of said section of the endless conveyor means, a plurality of heat applying assemblies carried by said endless conveyor means in position for each assembly to transmit heat to material being advanced by said advancing means while the assembly is carried along said section of the endless conveyor means, means yieldably connecting each heat applying assembly to said endless conveyor means for movement therewith, latch means for releasably engaging and thereby temporarily immobilizing the heat applying assemblies individually while the endless conveyor means continues to operate, and means operable by one of said assemblies when it has advanced a predetermined distance from said latch means for releasing the latch means to permit the next successive heat applying assembly to resume movement with said endless conveyor.

12. Apparatus for joining sheets comprising conveyor means for transporting the material along a predetermined path, a plurality of material engaging bars extending transversely of said material conveyor means, endless bar conveyor means adjacent said material conveyor means and including a reach adjacent said path of the material, means for mounting said bars on said bar conveyor means for normal movement of said bars with said material conveyor means along said path, said bar mounting means including means for accommodating relative motion of said bar conveyor means and said bars, and means for temporarily arresting motion of said bars relative to said material conveyor means while motion of said bar conveyor means continues.

13. Apparatus for joining sheets comprising conveyor means for transporting the material along a predetermined path, a plurality of material engaging bars extending transversely of said material conveyor means, endless bar conveyor means adjacent said material conveyor means and including a reach adjacent said path of the material, means for mounting said bars on said bar conveyor means for normal movement of said bars with said material conveyor means along said path, said bar mounting means including means for accommodating relative motion of said bar conveyor means and said bars, means for temporarily arresting motion of said bars relative to said material conveyor means while motion of said bar conveyor means continues, and means operable by one of said bars moving with said bar conveyor means for releasing a bar held by said bar arresting means.

14. Apparatus for joining sheets comprising conveyor means for transporting the material along a predetermined path, a plurality of material engaging bars extending transversely of said material conveyor means, endless bar conveyor means adjacent said material conveyor means and including a reach adjacent said path of the material, means for mounting said bars on said bar conveyor means for normal movement of said bars with said material conveyor means along said path, said bar mounting means including friction grip means for accommodating relative motion of said bar conveyor means and said bars, and means for temporarily arresting motion of said bars relative to said material conveyor means while motion of said bar conveyor means continues.

References Cited in the file of this patent

UNITED STATES PATENTS

| | | |
|---|---|---|
| 2,106,740 | Hepke | Feb. 1, 1938 |
| 2,720,246 | Piazze | Oct. 11, 1955 |